US008050926B2

(12) United States Patent
Huang

(10) Patent No.: US 8,050,926 B2
(45) Date of Patent: Nov. 1, 2011

(54) APPARATUS AND METHOD FOR ADJUSTING PROMPT VOICE DEPENDING ON ENVIRONMENT

(75) Inventor: Chien Ming Huang, Taipei Hsien (TW)

(73) Assignee: Micro-Star Int'l Co., Ltd, Jung-He (TW)

( * ) Notice: Subject to any disclaimer, the term of this patent is extended or adjusted under 35 U.S.C. 154(b) by 1028 days.

(21) Appl. No.: 11/935,339

(22) Filed: Nov. 5, 2007

(65) Prior Publication Data

US 2009/0063141 A1 Mar. 5, 2009

(30) Foreign Application Priority Data

Aug. 28, 2007 (TW) ............................... 96131787 A

(51) Int. Cl.
*G10L 15/00* (2006.01)

(52) U.S. Cl. ...... 704/258; 704/275; 704/278; 379/88.01

(58) Field of Classification Search .................. 704/258, 704/275, 278; 379/88.01
See application file for complete search history.

(56) References Cited

U.S. PATENT DOCUMENTS

| | | | | |
|---|---|---|---|---|
| 5,459,813 | A * | 10/1995 | Klayman | 704/209 |
| 6,298,247 | B1 | 10/2001 | Alperovich et al. | |
| 2002/0173950 | A1 * | 11/2002 | Vierthaler | 704/208 |
| 2006/0217068 | A1 * | 9/2006 | Angelopoulos | 455/63.1 |
| 2006/0229873 | A1 * | 10/2006 | Eide et al. | 704/260 |
| 2006/0270467 | A1 * | 11/2006 | Song et al. | 455/570 |
| 2010/0158219 | A1 * | 6/2010 | Dhawan et al. | 379/88.18 |

FOREIGN PATENT DOCUMENTS

| | | | |
|---|---|---|---|
| CN | 1065370 | A | 10/1992 |
| CN | 1113065 | A | 12/1995 |
| CN | 1783928 | | 6/2006 |
| CN | 101119544 | A | 2/2008 |
| DE | 4427912 | A1 | 2/1996 |
| DE | 19818217 | A1 | 10/1999 |
| DE | 102006001730 | A1 | 7/2007 |
| EP | 1189343 | A1 | 3/2002 |
| JP | 2004-297747 | A | 10/2004 |
| TW | 93125950 | | 3/2006 |

* cited by examiner

*Primary Examiner* — Daniel D Abebe
(74) *Attorney, Agent, or Firm* — Apex Juris, PLLC; Tracy M. Heims

(57) ABSTRACT

An apparatus for adjusting a prompt voice depending on an environment comprises a receiver module used for receiving a background sound, an analyzer module generating a control signal according to the background sound and an output module adjusting an output frequency of a prompt voice through the control signal and outputting the adjusted prompt voice.

19 Claims, 5 Drawing Sheets

APPARATUS AND METHOD FOR ADJUSTING PROMPT VOICE DEPENDING ON ENVIRONMENT

CROSS-REFERENCES TO RELATED APPLICATIONS

This non-provisional application claims priority under 35 U.S.C. §119(a) on Patent Application No(s). 096131787 filed in Taiwan, R.O.C. on Aug. 28, 2007, the entire contents of which are hereby incorporated by reference.

FIELD OF INVENTION

The present invention relates to an apparatus and method for adjusting a prompt voice, and more particularly to an apparatus and method for adjusting a prompt voice depending on an environment.

BACKGROUND

A general portable electronic device with a voice output function, for example, mobile phone, personal data assistant (PDA) and global positioning system (GPS), must use manual way to set a voice volume output. However, a user must use hands to adjust the volume of the portable electronic device once more accompanying the change of background sound volume; the output voice can then be heard clearly under different environments. Thus, it will cause the user to be inconvenient on use.

Thereupon, Taiwan Patent Application No. 93125950 entitled as "Apparatus and method for volume control" mainly discloses generating a corresponding volume adjustment signal and adjusting an output amplitude of an input voice source signal by analyzing the relationship between an environmental interference sound source signal and the input voice source signal when the environmental interference source signal comes in thereby improving inference problems caused from environmental factors to attain to the volume controlling object.

Furthermore, Chinese Patent No. CN1783928 entitled as "Method and apparatus for realizing automatically adjusting volume of ring tone in mobile terminal" mainly discloses setting a corresponding processing program in a cellular phone to automatically realize processing an adjustment to the volume of ring tone depending one a background noise situation of an environment in which it is located to satisfy a cellular phone user with a requirement for a different ring tone volume in a different environment. Therefore, a user's cellular phone can automatically detect the background noise situation of the current environment and process the automatic adjustment of the ring tone volume of the cellular phone depending on the aforesaid background noise situation so as to exempt the cellular phone user from a tedious operation of the manual ring tone volume adjustment thereby being convenient for the user's use.

Moreover, U.S. Pat. No. 6,298,247 entitled as "Method and Apparatus for Automatic Volume Control" is mainly applied on a communication device; it can measure background noise, and automatically adjust a volume of an output signal depending on the measured background noise signal.

The conventional technologies mentioned above disclose the technologies of automatically adjusting the output volume. The disclosed technologies are all used for adjusting the voice amplitude, i.e. so-called volume part. However, under certain environments, because background noise is too loud, it is unable to hear the output voice signals clearly even if the volume is adjusted to the largest. Besides, that the voice amplitude is adjusted higher causes the use of a speaker to be shortened. Therefore, how to effectively improve the problems of traditional automatic voice adjusting technologies is a topic to be solved urgently.

SUMMARY

For solving the problems mentioned above, the present invention proposes an apparatus and method for adjusting a prompt voice depending on an environment capable of maintaining an amplitude of the prompt voice at the same level without needing to increase the consumption power of a portable electronic device. Thus, a speaker outputting a prompt voice can be allowed to maintain the same power to prevent a high power from causing the speaker to be damaged and further to extend the use of the speaker.

The present invention proposes an apparatus for adjusting a prompt voice depending on an environment comprises a receiver module used for receiving background voices, an analyzer module generating a control signal depending on a background sound and an output module adjusting an output frequency of a prompt voice through the control signal and outputting the adjusted prompt voice.

The present invention also proposes a method for adjusting a prompt voice depending on an environment comprises the following steps: receiving a background sound, generating a control signal depending on the background sound, adjusting an output frequency of a prompt voice through the control signal and outputting the adjusted prompt voice.

BRIEF DESCRIPTION OF THE DRAWINGS

The present invention can be more fully understood by reference to the following description and accompanying drawings, in which.

DETAILED DESCRIPTION

Figure 1:
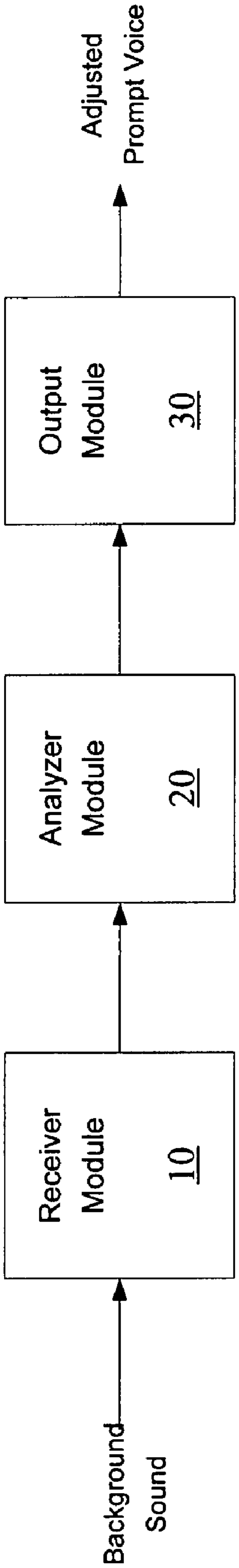
FIG. 1 is a block diagram, showing an apparatus for adjusting a prompt voice depending on an environment of a first preferred embodiment according to the present invention.

Please refer to FIG. 1. FIG. 1 is a block diagram, showing an apparatus for adjusting a prompt voice depending on an environment of a first preferred embodiment according to the present invention. An apparatus for adjusting a prompt voice depending on an environment comprises a receiver module 10, an analyzer module 20 and an output module 30.

Only if any portable electronic device is provided with a prompt voice outputting function, the apparatus for adjusting a prompt voice proposed by the present invention can be applied on it. As an environment that a user locates is different from another, the portable electronic device has a different background sound. Therefore, the receiver module 10 first receives the background sound to allow the apparatus of the present invention to obtain corresponding information of the background sound of the environment that the user locates to benefit for follow-up processes.

The analyzer module 20 generates a control signal according to the background sound received by the receiver module 10. And then, the output module 30 adjusts the output frequency of the prompt voice through the control signal and outputs the adjusted prompt voice. This shows that the difference between the present invention and the conventional art is that what the apparatus of the present invention adjusts is not a voice amplitude but the output frequency of the prompt voice.

Taking the apparatus for adjusting a prompt voice depending on an environment applied on a vehicle navigation device as an example to describe, environmental noise around a vehicle sometime is too large and a wind shear sound is generated from the high speed vehicle, the generated background noise will cover a prompt voice of the navigation device completely if a driver also opens a window at this time. A way that the conventional art does right now is to adjust the amplitude of the prompt voice larger, i.e. adjust the volume larger, but the driver is still unable to hear the prompt voice of the navigation device clearly because the outside noise is too loud such that the driver might miss turning a corner at an intersection.

If the apparatus of the present invention is adopted, when the analyzer module 20 analyzes the background sound received by the receiver module 20 to know that the volume of the background sound is higher than an average volume, it also means that the vehicle is located in a noisy environment and a control signal for adjusting frequency higher will be generated. And then, the output module 30 will adjust an output frequency of the prompt voice higher through the control signal and outputs the adjusted high frequency prompt voice; the reason is that the high frequency voice can still be easily identified by the human's ears even if he locates in an very noisy environment. Accordingly, the present invention adopts adjusting the output frequency of the prompt voice and being unnecessary to change the amplitude of the prompt voice; it can maintain a constant power output of a speaker. Otherwise, the output amplitude of the prompt voice is adjusted at the same time that the output frequency of the prompt voice is adjusted by means of the apparatus proposed by the present invention so that an effect better than the conventional art in which only simple adjustment of the output amplitude is done can be obtained.

In a particular condition of the example mentioned above, when other passengers are taking a rest in a vehicle and in the meantime car windows are closed, the background sound received by the receiver module 10 is quieter. The analyzer module 20 compares the volume of the background sound with the average volume, finds that the volume of the background sound is lower than the average volume and will control the output module 30 to adjust the output frequency of the prompt voice lower to avoid influencing the passengers and hence, the apparatus for automatically adjusting a prompt voice of the present invention can elevate the comfort and safety From the example of the first embodiment mentioned above we can know that the analyzer module 20 compares the volume of the background sound with the average volume to further generate the corresponding control signal and then transmits the generated control signal to the output module 30. At this time, three conditions will be generated: the first condition is that the control signal received by the output module 30 indicates that the volume of the background sound is higher than the average volume, I.e. the vehicle is in a noisy environment, the output module 30 will adjust the output frequency of the prompt voice higher to output a high frequency prompt voice at this time; the second condition is that the control signal received by the output module 30 indicates that the volume of the background sound is lower than the average volume, I.e. the vehicle is in a quiet environment, the output module 30 will adjust the output frequency of the prompt voice lower to output a low frequency prompt voice at this time; and the third condition is that the control signal received by the output module 30 indicates that the volume of the background sound is equal to the average volume, I.e. the vehicle is in a normal environment preset by the apparatus, the output module 30 will not adjust the output frequency of the prompt voice to output an original frequency prompt voice, i.e. middle frequency prompt voice at this time.

Figure 2:
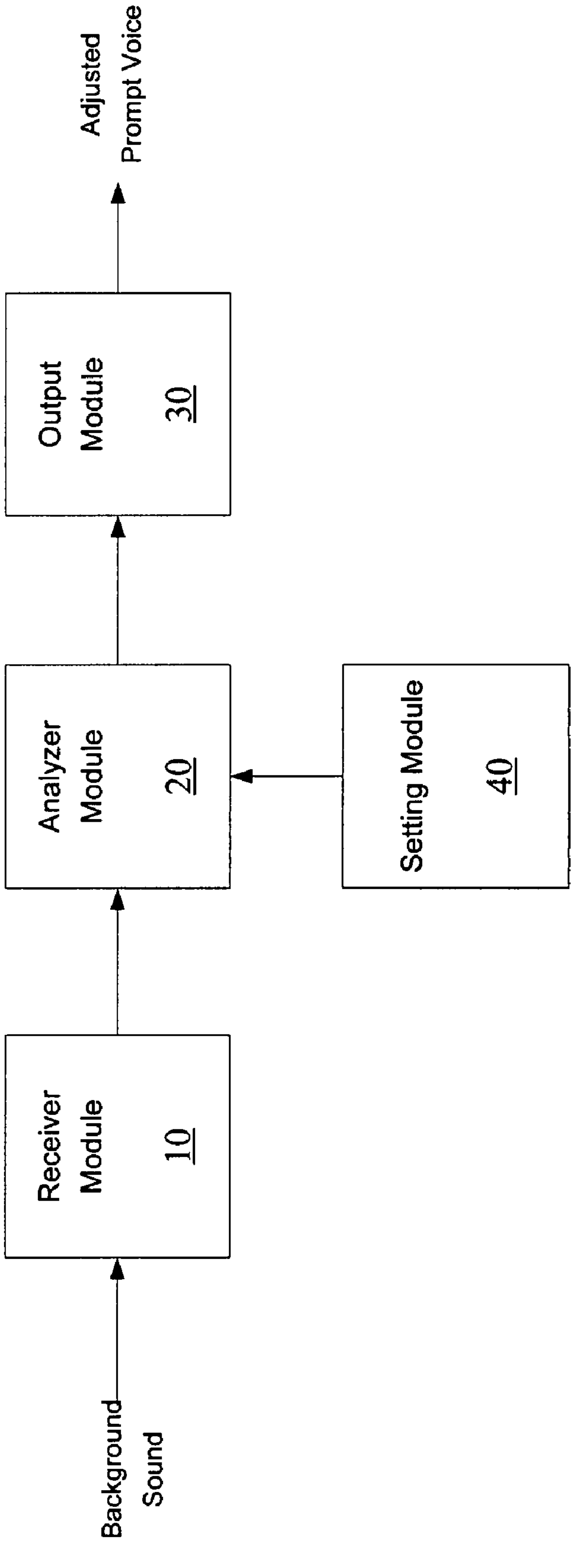
FIG. 2 is a block diagram, showing an apparatus for adjusting a prompt voice depending on an environment of a second preferred embodiment according to the present invention.

Please refer to FIG. 2. FIG. 2 is a block diagram, showing an apparatus for adjusting a prompt voice depending on an environment of a second preferred embodiment according to the present invention. The difference between the second embodiment and the first embodiment is that a setting module 40 is further added in the second embodiment. The setting module 40 allows a user to set the average volume mentioned above. As each person is different to the voice sensitivity, Taking a different age level as a an example, an elder's hearing is weaker such that an average volume value must be set lower to allow the analyzer module 20 to compare the volume of the background sound with a lower threshold average volume to generate a control signal meeting the elder's requirement and further to allow the output module 30 to adjust an output frequency prompt voice meeting the elder's requirement. Therefore, the setting module 20 adjusts a suitable average volume by itself depending on a different user's individual requirement to act as a reference value for allowing the analyzer module 20 to compare it with the volume of the background sound.

The average volume mentioned above may be a plurality of sets; that is to say, a user may set a plurality of different average volumes. When the analyzer module 20 judges that the volume of the background sound reaches the different average volume, it allows a different control signal to be generated to enable the output module 30 to adjust an output frequency of a different prompt voice through a different control signal. Thus, the output frequency of the different prompt voice can be adjusted timely depending on a different background sound condition to allow a user hear the prompt sound clearly no matter what kind of environment he locates in.

Besides, the analyzer module 20 can analyze the volume of the background sound but also a frequency range of the background sound to generate the background frequency range corresponding to the background sound. After the background frequency range of the background sound is analyzed, the output module 30 adjusts the frequency range of the prompt voice not to overlay the background frequency range. Because the adjusted frequency range of the prompt voice and the background frequency range are not overlaid with each other, after the frequency range of the prompt voice is adjusted through the output module 30, it can be kept away from a noisy frequency range to allow a user to hear the adjusted prompt voice output from the output module 30 easily.

Figure 3:
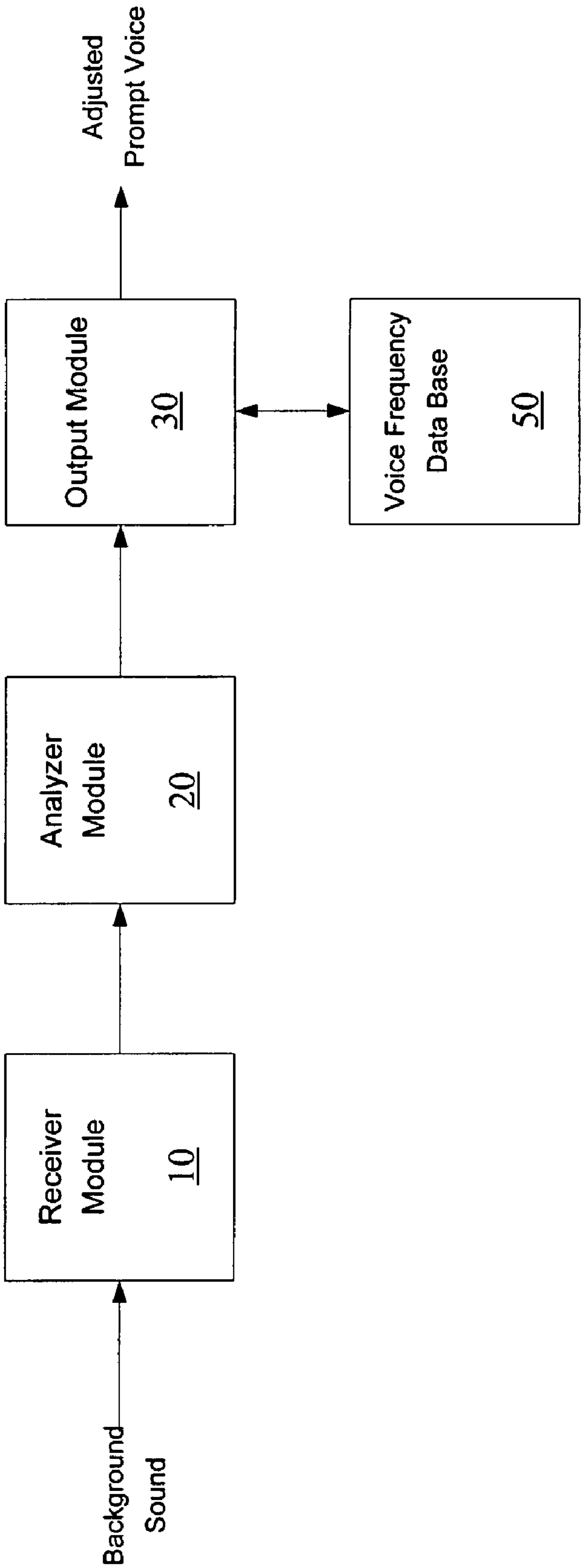
FIG. 3 is a block diagram, showing an apparatus for adjusting a prompt voice depending on an environment of a third preferred embodiment according to the present invention.

Please refer to FIG. 3. FIG. 3 is a block diagram, showing an apparatus for adjusting a prompt voice depending on an environment of a third preferred embodiment according to the present invention. A voice frequency data base 50 is extraordinarily added in the third embodiment comparing to the first embodiment. Here, the voice frequency data base 50 is used for storing a prompt voice consisting of multiple different frequencies. The output module 30 captures the prompt voice with one of the different frequencies from the voice frequency data base 50 according to the control signal generated form the analyzer module 20. Moreover, the voice frequency data base 50 may be set or recorded by a user himself so as to attain to the customization effect. That is to say, a user may preset the prompt voice consisting of multiple different frequencies depending on the requirement or favorite and then match it with a control signal, the prompt voice consisting of preset different frequencies can then be heard under the background voices of different environments.

Figure 4:
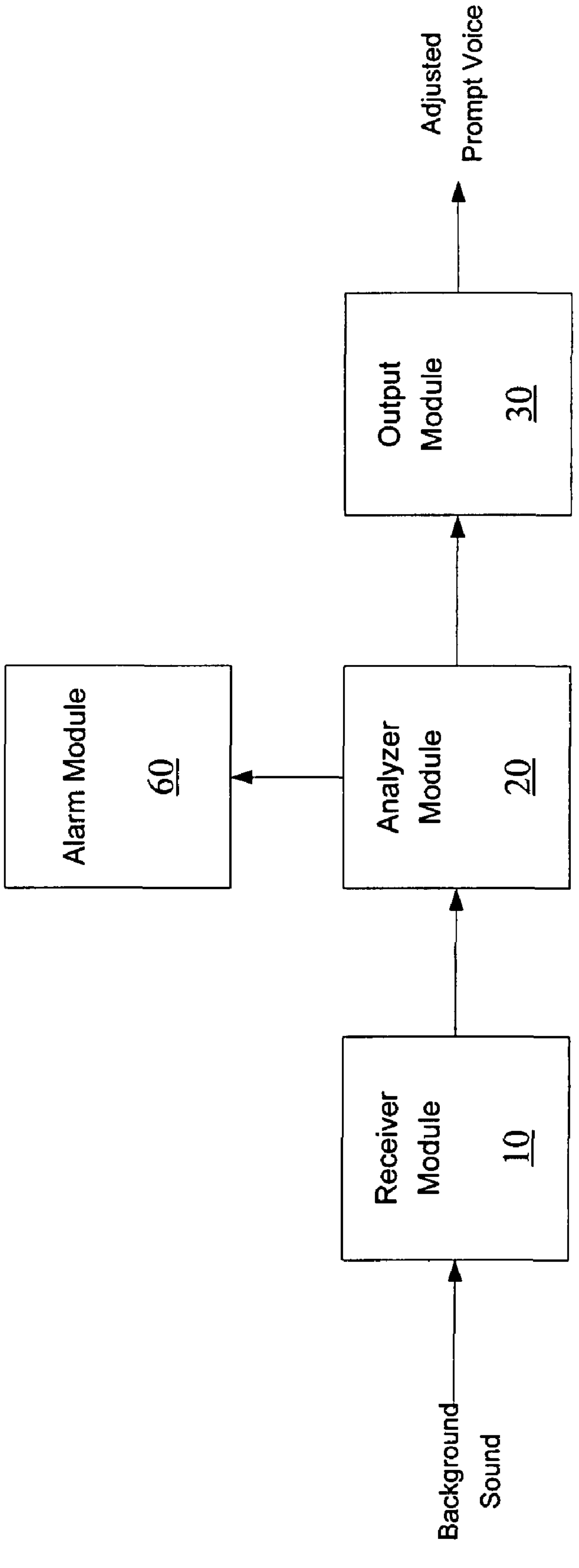
FIG. 4 is a block diagram, showing an apparatus for adjusting a prompt voice depending on an environment of a fourth preferred embodiment according to the present invention.

Please refer to FIG. 4. FIG. 4 is a block diagram, showing an apparatus for adjusting a prompt voice depending on an environment of a fourth preferred embodiment according to the present invention. The difference between the fourth embodiment and the first embodiment is that an alarm module 60 is further added in the fourth embodiment. The apparatus with a noise warning function is disclosed in the embodiment. After the receiver module 10 receives the background sound, and the analyzer module 20 then analyzes the background sound, if the volume of the background sound is found to be too large and beyond an alarm volume, the alarm module 60 will emit a warning signal. If the volume of the background sound of a environment in which a user locates for a long time is too large, his hearing function will be damaged so that the apparatus of the present invent will emit the warning signal timely to warn the user that the volume of the background sound is too large to allow the user to adjust an environmental sound source (e.g. the volume of a speaker in a car) lower timely or be far away from the noise source.

Figure 5:
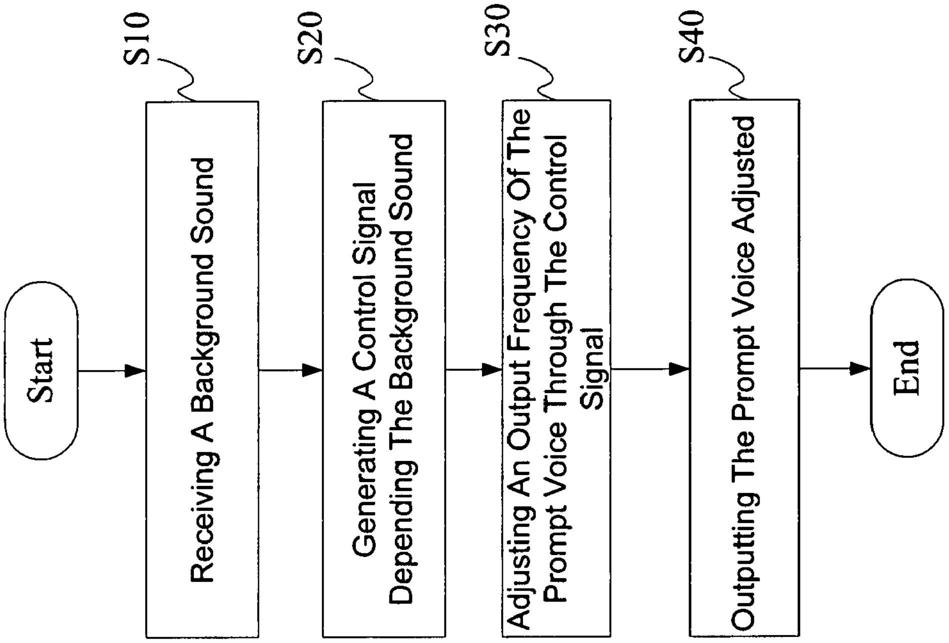
FIG. 5 is a flow chart, showing a method for adjusting a prompt voice depending on an environment according to the present invention.

Please refer to FIG. 5. FIG. 5 is a flow chart, showing a method for adjusting a prompt voice depending on an environment according to the present invention. The method comprises the following steps:

Step S10: receiving a background sound; because the method of the present invention can be used on every kind of portable electronic device, corresponding information of the background sound of an environment in which a portable electronic device is currently located can be known from the step to benefit for the proceedings of follow-up steps.

Step 20: generating a control signal depending the background sound; a frequency range of the background voice may first be analyzed to generate a background frequency range corresponding to the background sound and further to generate the corresponding control signal; otherwise, a volume of the background sound is compared with an average voice volume to generate the control signal, in which the average volume may be set by a user himself and a plurality of different average volume may be set.

Step 30: adjusting an output frequency of the prompt voice through the control signal; when the control signal generated according to Step 20 is obtained by analyzing the background frequency range of the background sound, a frequency range of the prompt voice is then adjusted not to overlay the background frequency range in Step 30; when the control signal is obtained by analyzing the volume of the background sound, if the volume of the background sound is higher than the average volume, an output frequency of the prompt voice is adjusted to be higher; vice versa, if the volume of the background sound is lower than the average volume, the output frequency of the prompt voice is adjusted to be lower.

Step S40: outputting the prompt voice adjusted through Step S30.

Besides, for attaining to the prompt voice customizing object to allow a user to set an individualized prompt sound by himself depending on the requirement or the favorite, the method may further comprise the following step: storing a prompt voice consisting of multiple different frequencies; the prompt voice with one of the multiple frequencies is captured to be the adjusted prompt voice according to the control signal, in which the user may set the prompt voice consisting of the multiple different frequencies by himself.

Besides, for attaining to the noise warning effect, the method may further comprises the following step: emitting a warning signal if the volume of the background sound is larger than a warning volume thereby warning the user to be far away from a too noisy environment or adjust the volume of the background sound lower to protect human's hearing from being hurt.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for adjusting a prompt voice depending on an environment, comprising:

a receiver module, used for receiving a background sound;

an analyzer module, generating a control signal according to the background sound;

an output module, adjusting an output frequency of a prompt voice through the control signal and outputting the adjusted prompt voice; and a voice frequency data base, used for storing the prompt voice consisting of multiple different frequencies.

2. The apparatus for adjusting a prompt voice depending on an environment according to claim 1, wherein the analyzer module analyzes the background sound to generate a background frequency range corresponding to the background sound.

3. The apparatus for adjusting a prompt voice depending on an environment according to claim 2, wherein the output module adjusts a frequency range of the prompt voice not to overlay the background frequency range.

4. The apparatus for adjusting a prompt voice depending on an environment according to claim 1, wherein the analyzer module compares a volume of the background sound with at least one average volume to generate the control signal.

5. The apparatus for adjusting a prompt voice depending on an environment according to claim 4, wherein if the control signal received by the analyzer module is that the volume of the background sound is higher than the average volume, the output module adjusts the output frequency of the prompt voice higher.

6. The apparatus for adjusting a prompt voice depending on an environment according to claim 4, wherein if the control signal received by the analyzer module is that the volume of the background sound is lower than the average volume, the output module adjusts the output frequency of the prompt voice lower.

7. The apparatus for adjusting a prompt voice depending on an environment according to claim 4, further comprising:

a setting module, allowing a user to set the average volume.

8. The apparatus for adjusting a prompt voice depending on an environment according to claim 1, wherein the output module captures the prompt voices with one of the different frequencies from the voice data base according to the control signal.

9. The apparatus for adjusting a prompt voice depending on an environment according to claim 1, wherein the voice frequency data base is set by a user himself.

10. The apparatus for adjusting a prompt voice depending on an environment according to claim 1, further comprising:

an alarm module, emitting a warning signal if the volume of the background sound is larger than a warning volume.

11. A method for adjusting a prompt voice depending on an environment, comprising the following steps:

storing a prompt voice consisting of multiple different frequencies;

receiving a background sound;

generating a control signal according to the background sound;

capturing the prompt voice with one of the different frequencies to be an adjusted prompt voice according to the control signal; and outputting the adjusted prompt voice.

12. The method for adjusting a prompt voice depending on an environment according to claim 11, wherein the step of receiving a background sound further comprises:

analyzing the background sound to generate a background frequency range corresponding to the background sound.

13. The method for adjusting a prompt voice depending on an environment according to claim 12, wherein the step of capturing the prompt voice with one of the different frequencies further comprises:

adjusting a frequency range of the prompt voice not to overlay the background frequency range.

14. The method for adjusting a prompt voice depending on an environment according to claim 11, wherein the step of generating a control signal according to the background sound further comprises:

comparing a volume of the background sound with at least one average volume and generating the control signal.

15. The method for adjusting a prompt voice depending on an environment according to claim 14, wherein if the volume of the background is higher than the average volume, the output frequency of the prompt voice is adjusted higher.

16. The method for adjusting a prompt voice depending on an environment according to claim 14, wherein if the volume of the background is lower than the average volume, the output frequency of the prompt voice is adjusted lower.

17. The method for adjusting a prompt voice depending on an environment according to claim 14, further comprising:

allowing a user to set the average volume.

18. The method for adjusting a prompt voice depending on an environment according to claim 11, wherein the prompt voice consisting of the multiple difference frequencies is set by a user himself.

19. The method for adjusting a prompt voice depending on an environment according to claim 11, further comprising:

emitting a warning signal if a volume of the background sound is larger than a warning volume.

* * * * *